US011180663B2

(12) United States Patent
Oleske

(10) Patent No.: US 11,180,663 B2
(45) Date of Patent: Nov. 23, 2021

(54) COLOR CHANGING ADHESIVE BOND PRIMER

(71) Applicant: UNITED TECHNOLOGIES CORPORATION, Farmington, CT (US)

(72) Inventor: Katharine Oleske, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 291 days.

(21) Appl. No.: 16/396,264

(22) Filed: Apr. 26, 2019

(65) Prior Publication Data
US 2020/0339822 A1 Oct. 29, 2020

(51) Int. Cl.
| B32B 41/00 | (2006.01) |
| C09D 5/00 | (2006.01) |
| C09D 7/20 | (2018.01) |
| C09J 5/02 | (2006.01) |
| C23F 1/20 | (2006.01) |

(52) U.S. Cl.
CPC ............ *C09D 5/002* (2013.01); *C09D 7/20* (2018.01); *C09J 5/02* (2013.01); *C23F 1/20* (2013.01); *C09J 2400/166* (2013.01)

(58) Field of Classification Search
CPC ... C09D 5/002; C09D 7/20; C23F 1/20; C09J 5/02; C09J 2400/166
USPC .............. 156/60, 64, 350, 351, 378, 379
See application file for complete search history.

(56) References Cited

U.S. PATENT DOCUMENTS

| 3,874,921 | A | 4/1975 | Todd |
| 4,166,058 | A | 8/1979 | Svigelj et al. |
| 2007/0275234 | A1 | 11/2007 | Lim et al. |
| 2015/0096680 | A1* | 4/2015 | Zhao ............ C09D 5/002 156/330 |
| 2018/0186124 | A1 | 7/2018 | Zhao et al. |
| 2019/0177568 | A1* | 6/2019 | Nakajima ............ C08L 51/06 |

FOREIGN PATENT DOCUMENTS

| KR | 20040075193 | 8/2004 |
| WO | 9914277 | 3/1999 |
| WO | 2005017046 | 2/2005 |
| WO | WO-2017195828 A1 * | 11/2017 ............ C08L 23/08 |

OTHER PUBLICATIONS

"DAPCO 1-100 Primer", Color changing Silicone Primer. Aug. 15, 2001. 1 page. D Aircraft Products, Inc., Anaheim, CA.
European Patent Office, European Search Report dated Sep. 14, 2020 in Application No. 20171346.8.
(Continued)

*Primary Examiner* — Michael N Orlando
*Assistant Examiner* — Joshel Rivera
(74) *Attorney, Agent, or Firm* — Snell & Wilmer L.L.P.

(57) ABSTRACT

A thickness-detecting bond primer is disclosed. In various embodiments, the thickness-detecting bond primer includes a solvent configured for application to a metallic surface; and a dye dispersed within the solvent, the dye having a concentration within a range of about 0.001 weight percent to about 5.0 weight percent of the thickness-detecting bond primer.

9 Claims, 4 Drawing Sheets

(56) References Cited

OTHER PUBLICATIONS

BASF: "Paliotol Yellow L 1155 Paliotol Gelb L 1155", Feb. 27, 2009 (Feb. 27, 2009), pp. 1-2, XP055725784, Retrieved from the Internet: URL:http://xtgchem.cn/upload/20110704120354.pdf.
Anyang General Chemical Co, Ltd., "Photoinitiator 369 (CAS 119313-12-1 ), contact us for quality UV photoinitiators", May 25, 2018 (May 25, 2018), pp. 1-4, XP055726608, Retrieved from the Internet:URL:http://www.sellchems.com/products/uv-photoinitiators/ photoinitiator-369-cas-119313-12-1 /.

\* cited by examiner

COLOR CHANGING ADHESIVE BOND PRIMER

FIELD

The present disclosure relates generally to bond primers and, more particularly, to color changing adhesive bond primers.

BACKGROUND

Bond primers play important roles in the process of adhering various components to one another, such as, for example, when adhering titanium sheaths to aluminum substructures comprising fan blades for gas turbine engines. One role of the bond primer is to enhance chemical compatibility between the various components to be adhered and an adhesive applied subsequent to application of the bond primer. Another role played by the bond primer is protection of the various components following an etching process. Etching processes are applied to metallic components or to a metallic surface of such components in order to clean the exterior surfaces of the components and to increase the surface area of the components by creating porosity within the exterior surfaces. However, in various processes, a surface treated by an etching process requires the surface be further treated within a short period of time, on the order of twenty-four hours or less, in order to protect the surface from degradation. A bond primer may be applied to such surface following the etching process, thereby protecting the surface from subsequent degradation for relatively longer periods of time, on the order of months or even years, for example.

When applying the bond primer, care should be taken to ensure the thickness of the bond primer falls within an acceptable range. If the bond primer is too thin, for example, incomplete coverage of the surface may result, leading to degradation of the component being treated and subsequently adhered to another component. If the bond primer it too thick, the bond primer may become embrittled and subject to failure when the adhered components are subjected to operational conditions.

SUMMARY

A thickness-detecting bond primer is disclosed. In various embodiments, the thickness-detecting bond primer includes a solvent configured for application to a metallic surface; and a dye dispersed within the solvent, the dye having a concentration within a range of about 0.001 weight percent to about 5.0 weight percent of the thickness-detecting bond primer.

In various embodiments, the concentration of the dye is about 0.003 weight percent to about 0.05 weight percent of the thickness-detecting bond primer. In various embodiments, the concentration of the dye is about 0.004 weight percent to about 0.04 weight percent of the thickness-detecting bond primer. In various embodiments, the solvent comprises a diacetone alcohol within about 14.94 to about 39.84 weight percent of the thickness-detecting bond primer. In various embodiments, the solvent comprises a methyl ethyl ketone within about 14.94 to about 39.84 weight percent of the thickness-detecting bond primer. In various embodiments, the dye is configured for detection of a target layer-thickness of about 0.0001 to about 0.0003 inches and to distinguish a thickness greater than or less than the target layer-thickness via a color change of the dye.

In various embodiments, the dye comprises a heterocyclic organic component. In various embodiments, the heterocyclic organic component is about 0.003 weight percent to about 0.05 weight percent of the thickness-detecting bond primer. In various embodiments, the heterocyclic organic component is about 0.004 weight percent to about 0.04 weight percent of the thickness-detecting bond primer.

A method of adhering a first metallic component to a second metallic component is disclosed. In various embodiments, the method includes the steps of performing an etching process to a first surface of the first metallic component and to a second surface of the second metallic component; applying a thickness-detecting bond primer to the first surface and to the second surface, the thickness-detecting bond primer comprising a solvent and a dye dispersed within the solvent, the dye having a concentration within a range of about 0.001 weight percent to about 5.0 weight percent of the thickness-detecting bond primer; curing the thickness-detecting bond primer; applying an adhesive to the thickness-detecting bond primer on both the first surface and the second surface following curing the thickness-detecting bond primer; and bringing the first surface into contact with the second surface and allowing the adhesive to cure.

In various embodiments, the concentration of the dye is about 0.003 weight percent to about 0.05 weight percent of the thickness-detecting bond primer. In various embodiments, the concentration of the dye is about 0.004 weight percent to about 0.04 weight percent of the thickness-detecting bond primer. In various embodiments, the dye comprises a heterocyclic organic component.

In various embodiments, the solvent comprises a diacetone alcohol within about 14.94 to about 39.84 weight percent of the thickness-detecting bond primer. In various embodiments, the solvent comprises a methyl ethyl ketone within about 14.94 to about 39.84 weight percent of the thickness-detecting bond primer. In various embodiments, the dye is configured for detection of a target layer-thickness of about 0.0001 to about 0.0003 inches and to distinguish a thickness greater than or less than the target layer-thickness via a color change of the dye.

In various embodiments, the method includes the step of detecting a target layer-thickness of about 0.0001 to about 0.0003 inches of the thickness-detecting bond primer following curing the thickness-detecting bond primer via a color change of the dye.

In various embodiments, the first metallic component is a fan blade substructure and the second metallic component is a leading edge sheath or a suction side cover. In various embodiments, each of the fan blade substructure, the leading edge sheath and the suction side cover comprises an aluminum alloy or a titanium alloy.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
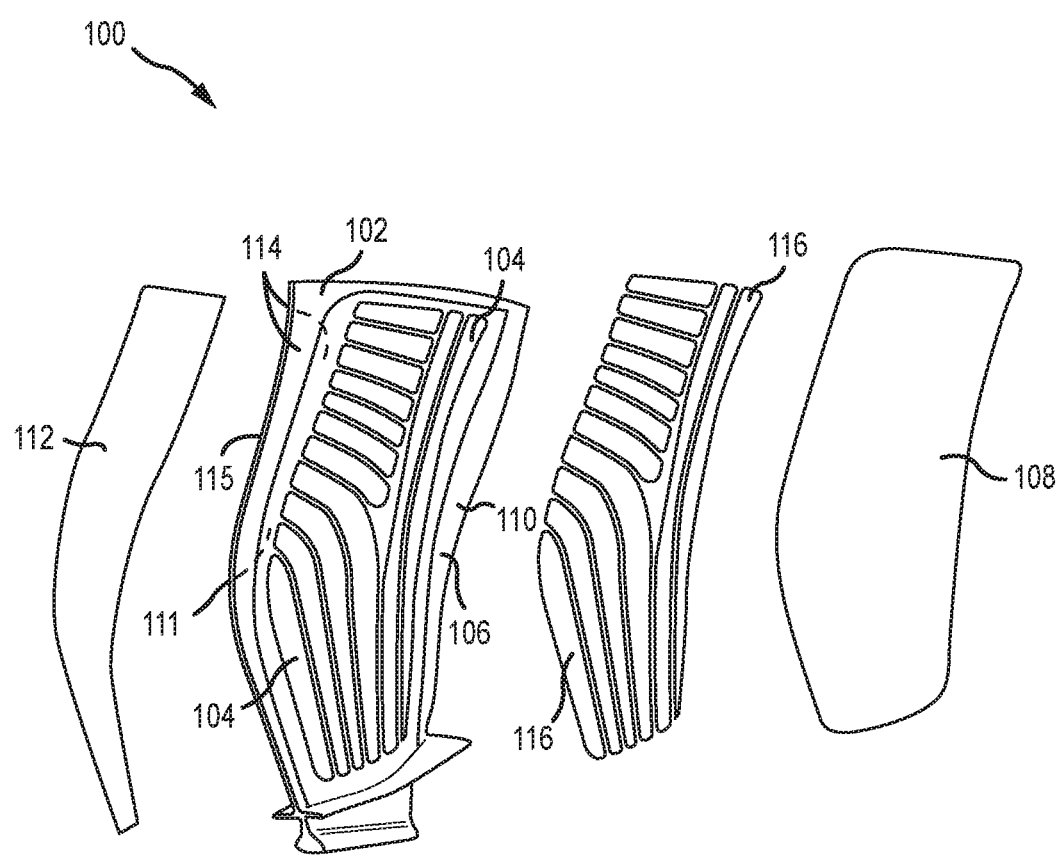
FIG. 1 is an exploded schematic view of a fan blade for a gas turbine engine undergoing an adhering process, in accordance with various embodiments.

Referring now to the drawings, FIG. 1 schematically illustrates a fan blade 100 for a gas turbine engine undergoing an adhering process. While the disclosure is described with reference to the fan blade 100, the application is exemplary only, as the disclosure contemplates applications to other components intended to be adhered to one another, including components from a wide variety of other industrial applications, both within and without the aerospace or gas turbine engine industries. As illustrated, the fan blade 100 includes a blade substructure 102 (or a fan blade substructure) that includes a plurality of grooves 104 disposed within a surface 106 of the blade substructure 102. In various embodiments, the blade substructure 102 may comprise a metallic material, such as, for example, aluminum or an aluminum alloy. The fan blade 100 further includes a suction side cover 108 (or a fan blade cover) configured for adhering to a suction side surface 110 (or a first surface) of the blade substructure 102 and a leading edge sheath 112 (or a fan blade sheath) configured for adhering to a leading edge surface 114 that extends a distance aft from a leading edge 115 on both the suction side surface 110 and a pressure side surface 111 (or a second surface) of the blade substructure 102. In various embodiments, the suction side cover 108 and the leading edge sheath 112 may comprise a metallic material, such as, for example, titanium or a titanium alloy or aluminum or an aluminum alloy. In various embodiments, the fan blade 100 may also include a plurality of filler strips 116 configured to fit within the plurality of grooves 104. In various embodiments, the plurality of filler strips 116 are either porous or solid and may comprise a non-metallic material, such as, for example, a polyurethane material, or a metallic material, such as, for example, titanium, aluminum or an alloy of titanium or aluminum material.

In various embodiments, an adhering process may be applied to the components just described to produce the fan blade 100 in assembled form. For example, an etching process may be applied to the suction side surface 110 and to the pressure side surface 114 of the blade substructure 102. Similarly, an etching process may be applied to the inner surfaces of the suction side sheath 108 and to the pressure side sheath 112. In various embodiments, the etching process may comprise coating the various surfaces or the entire blade substructure 102 just described with an acidic solution, such as, for example, a phosphoric acid solution. Following the etching process, a bond primer, whose composition is described below, may be applied to the various surfaces previously etched. Typically, the bond primer is applied within a period of twenty-four hours following the etching process. Following application of the bond primer, the component parts may be stored for an extended period of time or may be adhered together using an adhesive to create the fan blade 100 in assembled form.

Figure 2:
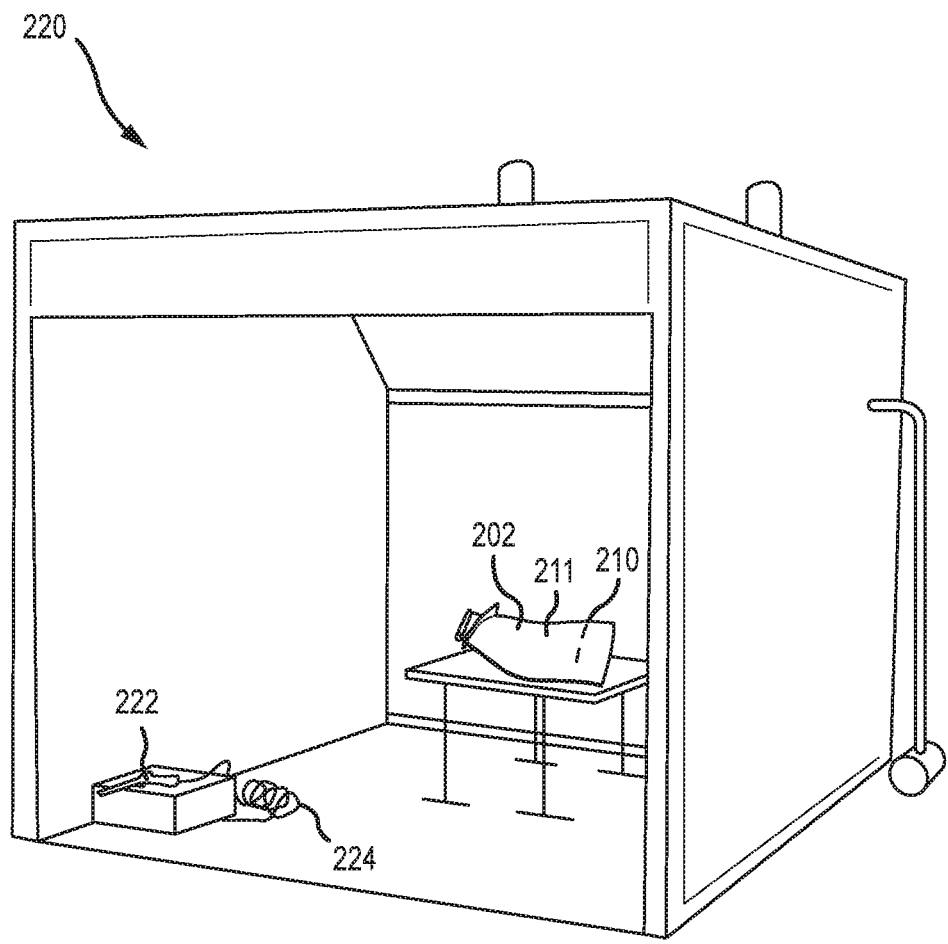
FIG. 2 is a schematic view of a spray booth used to apply a bond primer to a surface of a component, in accordance with various embodiments.

In various embodiments, the bond primer may be applied to the surfaces of components to be adhered, such as, for example, the surfaces of the blade substructure 102, the suction side cover 108 and the leading edge sheath 112 using a brush or a spray applicator. Referring to FIG. 2, for example, a spray booth 220 is illustrated having a spray applicator 222 coupled to a pressure source via a hose 224. In various embodiments, the spray applicator 222 may be used to apply the bond primer to a surface of a component part, such as, for example, a suction side surface 210 and a pressure side surface 211 of a blade substructure 202, similar to the suction side surface 110 and the pressure side surface 114 of the blade substructure 102 described above with reference to FIG. 1. While the spray applicator 222 illustrated in FIG. 2 is applicable to a single component (e.g., the blade substructure 202), the disclosure contemplates assembly-line applications, where multiple components (e.g., tens or hundreds of components) are treated with bond primer at the same time or in sequential fashion. Further, the disclosure contemplates applications where various embodiments of the bond primer described below are applied in a test-like application (e.g., applied to a flat plate) to analyze the efficacy of the various embodiments of the bond primer, as well as to various curing conditions of the various embodiments of the bond primer.

A beneficial aspect of the bond primer described in the present disclosure is the ability to detect the thickness of the bond primer following its application and cure by observing the color of the bond primer once cured. In various embodiments, the bond primer (or the thickness-detecting bond primer) of the present disclosure contemplates the following components and concentrations by weight percent, with each indicated weight percent (wt %) of the various components being considered to fall within a range defined by ±10% of the indicated value of wt % (e.g., 14.94 wt % should be considered to fall within a range defined by 14.94 wt %±1.494 wt %):

| Component | wt % |
|---|---|
| Diacetone Alcohol | 14.94-39.84 |
| Methyl Ethyl Ketone | 14.94-39.84 |
| Tetrahydrofuran | 9.96-29.88 |
| 1-Methoxy-2-Propanol | 0.996-4.98 |

-continued

| Component | wt % |
| --- | --- |
| Epoxy Resin | 0.996-4.98 |
| Water | 0.996-4.98 |
| 3-(Trimethoxysilyl)Propyl Glycidyl Ether | 0.0996-0.996 |
| Phenol-Formaldehyde Polymer Glycidyl Ether | 0.0996-0.996 |
| Strontium Chromate (VI) | <0.996 |
| Phenolic Polymer | <0.3984 |
| Methyl Alcohol | <0.2988 |
| Acetone | <0.1494 |
| Heterocyclic Organic Dye | 0.004-0.04 |
| Isopropanol | 0.004-0.04 |

As indicated in the above chart, in various embodiments, the bond primer contains a heterocyclic organic dye in a concentration ranging from 0.004-0.04 weight percent; though, in various embodiments, and as described below, the dye may range from about 0.001 weight percent to about 5.0 weight percent, and in various embodiments, the dye concentration may range from about 0.003 weight percent to about 0.05 weight percent. The indicated range of dye, together with the other components within the various indicated ranges, provides a bond primer that, when applied to a surface and cured, enables visual detection of the thickness of the bond primer. In various embodiments, the bond primer includes a solvent, comprising diacetone alcohol and methyl ethyl ketone, and the dye includes a heterocyclic organic component. In various embodiments, the cure cycle for the bond primer includes a temperature of about 250° F. for a duration of one hour. In various embodiments, the cure cycle for the bond primer may include a duration of two hours at room temperature, followed by a co-cure with an adhesive for one hour at a temperature of about 250° F. Following cure of the bond primer, the part may be visually inspected to ensure thickness of the bond primer falls within a target range which, in various embodiments, is on the order of 0.0001-0.0003 inches (2.54-7.62 µm).

Consistent with the foregoing, in various embodiments, a thickness-detecting bond primer may comprise a solvent and a dye. For example, in various embodiments, a thickness-detecting bond primer may comprise between 15 wt % and 40 wt % diacetone alcohol and between about 0.001 wt % and about 5.0 wt % heterocyclic organic dye. In various embodiments, a thickness-detecting bond primer may comprise between 15 wt % and 40 wt % diacetone alcohol, between 15 wt % and 40 wt % methyl ethyl ketone and between about 0.004 wt % and about 0.04 wt % heterocyclic organic dye. In various embodiments, a thickness-detecting bond primer may comprise between 15 wt % and 40 wt % diacetone alcohol, between 15 wt % and 40 wt % methyl ethyl ketone, between 10 wt % and 30 wt % tetrahydrofuran and between about 0.004 wt % and about 0.04 wt % heterocyclic organic dye. In various embodiments, a thickness-detecting bond primer may comprise between 15 wt % and 40 wt % diacetone alcohol, between 15 wt % and 40 wt % methyl ethyl ketone, between 10 wt % and 30 wt % tetrahydrofuran, between 1 wt % and 5 wt % 1-methoxy-2-propanol, between 1 wt % and 5 wt % epoxy resin, between 1 wt % and 5 wt % water and between 0.004 wt % and 0.04 wt % heterocyclic organic dye. In various embodiments, including any of the foregoing embodiments, a thickness-detecting bond primer may additionally comprise, between 0.01 wt % and 1.0 wt % 3-(trimethoxysilyl) propyl plycidyl ether, between 0.01 wt % and 1.0 wt % phenol-formaldehyde polymer glycidyl ether, between 0 wt % and 1.0 wt % strontium chromate (VI), between 0 wt % and 0.4 wt % phenolic polymer, between 0 wt % and 0.3 wt % methyl alcohol, between 0 wt % and 0.15 wt % acetone, and between about 0.004 wt % and about 0.04 wt % isopropanol.

Figure 3D:
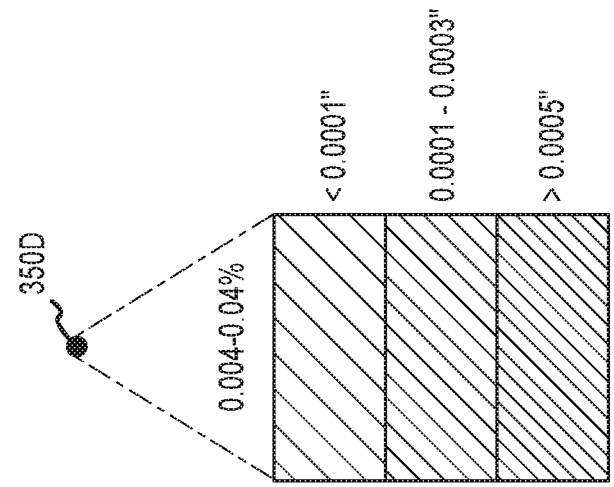
FIGS. 3A, 3B, 3C and 3D are schematic views illustrating the thickness of a bond primer applied to a surface of a component as a function of dye concentration within the bond primer, in accordance with various embodiments.
Figure 3C:
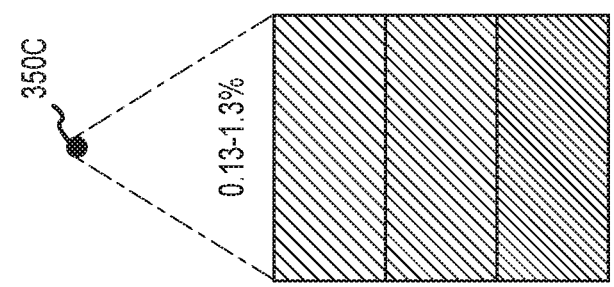
Figure 3B:
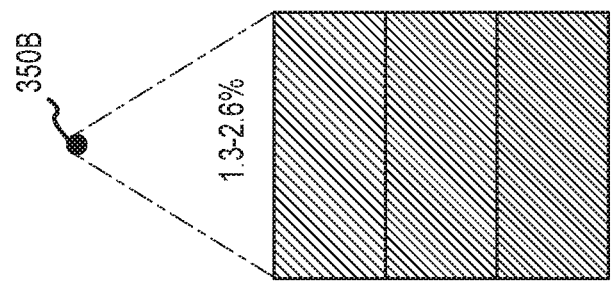
Figure 3A:
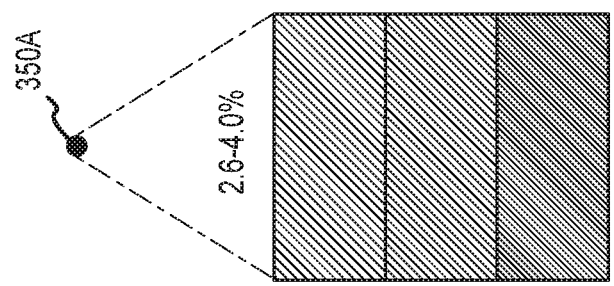

Referring now to FIGS. 3A, 3B, 3C and 3D, results of a feasibility study of the bond primer above described are illustrated in schematic form. Referring specifically to FIG. 3A, for example, a bond primer was formulated with a concentration of a heterocyclic organic dye on the order of about 2.6 to about 4.0 weight percent. The bond primer was applied to an aluminum surface over a range of three thicknesses and cured at a temperature of about 250° F. for a duration of one hour. As illustrated, the range of three thicknesses include a first thickness of <0.0001 inches (<2.54 µm), a second thickness within a range of 0.0001-0.0003 inches (2.54-7.62 µm), and a third thickness of >0.0005 inches (>12.7 µm). A target layer-thickness is considered to be within the range of the second thickness, i.e., within a range of 0.0001-0.0003 inches (2.54-7.62 µm). As indicated, the resulting color of the three thicknesses of the cured bond primer varies according to the thickness (e.g., the darker the color of the bond primer, the greater the density of the hash marks in the illustrations). Visual inspection of the three colors of the bond primer, cured as indicated above, enables detection of the layer having the target layer-thickness, as well as the thickness of the two layers having thicknesses greater than and less than the target layer-thickness.

Referring to FIGS. 3B, 3C and 3D, results of the same study performed at concentrations of heterocyclic organic dye on the order of about 1.3 to about 2.6 weight percent, about 0.13 to about 1.3 weight percent and about 0.004 to about 0.04 weight percent, respectively, are illustrated. Similar to the results described above with reference to FIG. 3A, each of the three additional sets of results enable detection of the layer having the target thickness, as well as the two layers having thicknesses greater than and less than the target thickness, via visual detection. The tests conducted for each of the cases illustrated in FIGS. 3A, 3B, 3C and 3D were carried out using a black colored dye and a green colored dye, with little variation in the results (i.e., the results indicated little variation in the relative color densities as a function of the relative thicknesses depending on the color of dye used). Further, shear tests performed on the cured bond primer in the case of FIG. 3D (i.e., at a concentration of heterocyclic organic dye on the order of about 0.004 to about 0.04 weight percent), indicated no knockdown (or reduction) in shear strength, when compared with a baseline test of a bond primer having no dye component.

As indicated above, in various embodiments, visual detection may be employed to discern the color of the color change associated with the various thicknesses of the bond primer following curing. Visual detection, e.g., by a human, may be sufficient when performing test cases of various formulations or curing conditions. During assembly line-like applications, however, various apparatus capable of spectroscopic analysis may be desirable. For example, referring still to FIGS. 3A, 3B, 3C and 3D, a sensor (e.g., 350A, 350B, 350C and 350D), such as, for example, an ultraviolet-visible spectroscopy sensor, is illustrated as providing non-human detection or analysis of the surfaces of the various layers of bond primer. In various embodiments, the sensor is configured to scan the surface of a layer of bond primer, collect data concerning the surface color of the bond primer, analyze the data in conjunction with a processor, and report the resulting color (e.g., the wavelength of the color) to a processor configured to monitor quality of the bond primer application process.

Figure 4:
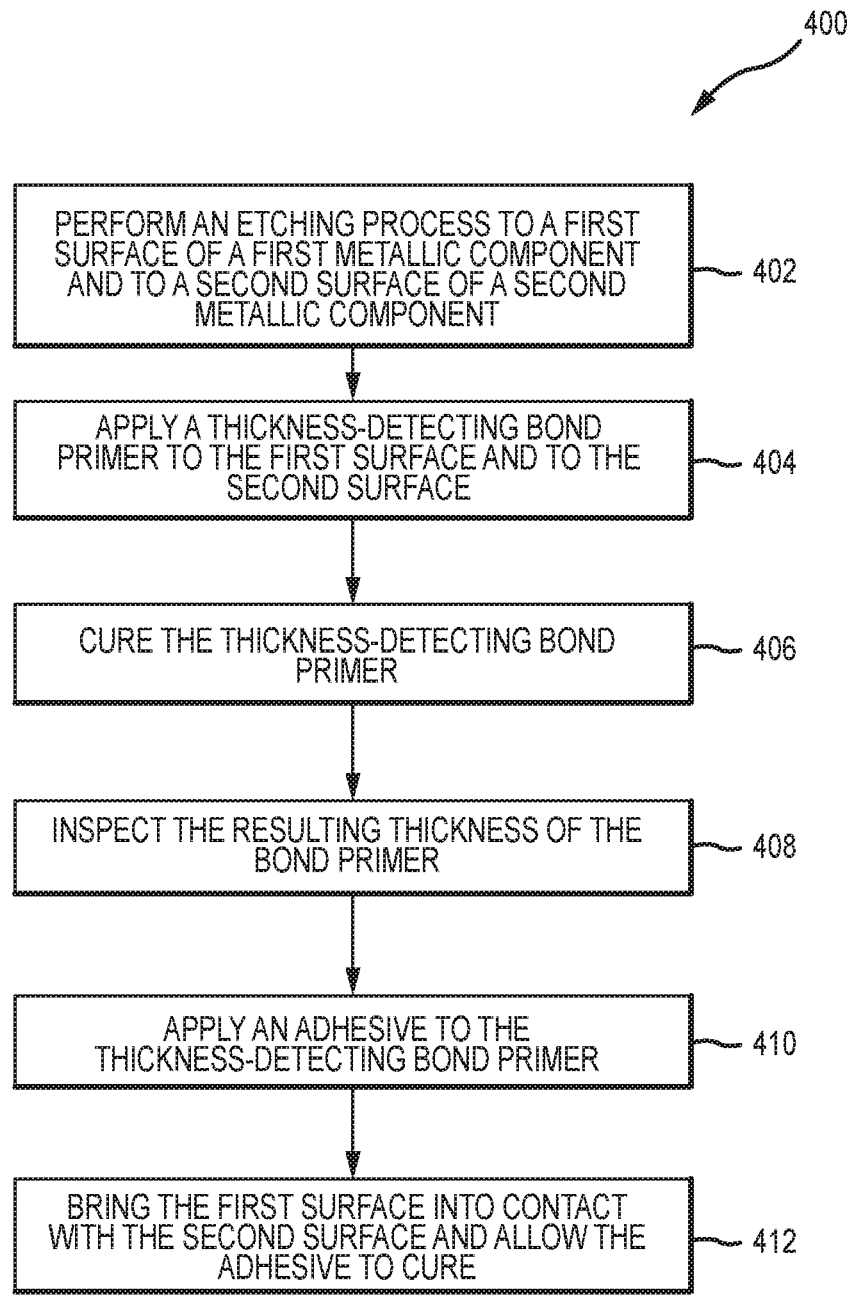
FIG. 4 describes a method of adhering a first component to a second component using a bond primer, in accordance with various embodiments.

Referring now to FIG. 4, a method 400 of adhering a first metallic component having a first metallic surface (or a first surface) to a second metallic component having a second metallic surface (or a second surface) is described. In various embodiments, the first metallic component may comprise a leading edge sheath or a suction side cover and the second metallic component may comprise a fan blade substructure. In a first step 402, an etching process is performed on the surfaces of the first metallic component and the second metallic component to be adhered. In a second step 404, a bond primer is applied to the surfaces of the first metallic component and the second metallic component. In various embodiments, the bond primer contains a heterocyclic organic dye in a concentration ranging from 0.004-0.04 weight percent and is applied at a target thickness within a range of 0.0001-0.0003 inches (2.54-7.62 µm). In a third step 406, the bond primer is cured. In various embodiments, the cure cycle is performed at a temperature of about 250° F. for a duration of one hour. In a fourth step 408, an inspection of the resulting thickness of the bond primer, following the curing step, is performed. In various embodiments, the inspection of the thickness may be performed by detecting a color change, either visually or analytically, using, for example, an ultraviolet-visible spectroscopy technique. In a fifth step 410, an adhesive is applied to the cured bond primer on the surfaces of the first metallic component and the second metallic component. In a sixth step 412, the surfaces of the first metallic component and the second metallic component having the adhesive applied are bought into contact and the adhesive is permitted to cure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A thickness-detecting bond primer, comprising:
    a solvent configured for application to a metallic surface; and
    a dye dispersed within the solvent, the dye having a concentration within a range of about 0.001 weight percent to about 5.0 weight percent of the thickness-detecting bond primer,
        wherein the concentration of the dye is about 0.004 weight percent to about 0.04 weight percent of the thickness-detecting bond primer,
        wherein the solvent comprises a diacetone alcohol within about 14.94 to about 39.84 weight percent of the thickness-detecting bond primer and a methyl ethyl ketone within about 14.94 to about 39.84 weight percent of the thickness-detecting bond primer and
        wherein the dye is configured for detection of a target layer-thickness of about 0.0001 to about 0.0003 inches and to distinguish a thickness greater than or less than the target layer-thickness via a color change of the dye.

2. The thickness-detecting bond primer of claim 1, wherein the dye comprises a heterocyclic organic component.

3. The thickness-detecting bond primer of claim 2, wherein the heterocyclic organic component is about 0.003 weight percent to about 0.05 weight percent of the thickness-detecting bond primer.

4. The thickness-detecting bond primer of claim 3, wherein the heterocyclic organic component is about 0.004 weight percent to about 0.04 weight percent of the thickness-detecting bond primer.

5. A method of adhering a first metallic component to a second metallic component, comprising:

performing an etching process to a first surface of the first metallic component and to a second surface of the second metallic component;

applying a thickness-detecting bond primer to the first surface and to the second surface, the thickness-detecting bond primer comprising a solvent and a dye dispersed within the solvent, the dye having a concentration within a range of about 0.001 weight percent to about 5.0 weight percent of the thickness-detecting bond primer, wherein the concentration of the dye is about 0.004 weight percent to about 0.04 weight percent of the thickness-detecting bond primer, wherein the solvent comprises a diacetone alcohol within about 14.94 to about 39.84 weight percent of the thickness-detecting bond primer and a methyl ethyl ketone within about 14.94 to about 39.84 weight percent of the thickness-detecting bond primer and wherein the dye is configured for detection of a target layer-thickness of about 0.0001 to about 0.0003 inches and to distinguish a thickness greater than or less than the target layer-thickness via a color change of the dye;

curing the thickness-detecting bond primer;

applying an adhesive to the thickness-detecting bond primer following curing the thickness-detecting bond primer; and bringing the first surface into contact with the second surface and allowing the adhesive to cure.

6. The method of claim 5, wherein the dye comprises a heterocyclic organic component.

7. The method of claim 5, further comprising detecting a target layer-thickness of about 0.0001 to about 0.0003 inches of the thickness-detecting bond primer following curing the thickness-detecting bond primer via a color change of the dye.

8. The method of claim 7, wherein the first metallic component is a fan blade substructure and the second metallic component is a leading edge sheath or a suction side cover.

9. The method of claim 8, wherein each of the fan blade substructure, the leading edge sheath and the suction side cover comprises a titanium alloy or an aluminum alloy.

* * * * *